Dec. 19, 1961  D. E. MORAN ET AL  3,014,103
ELECTRICAL SWITCHING APPARATUS
Filed March 31, 1959  4 Sheets-Sheet 1
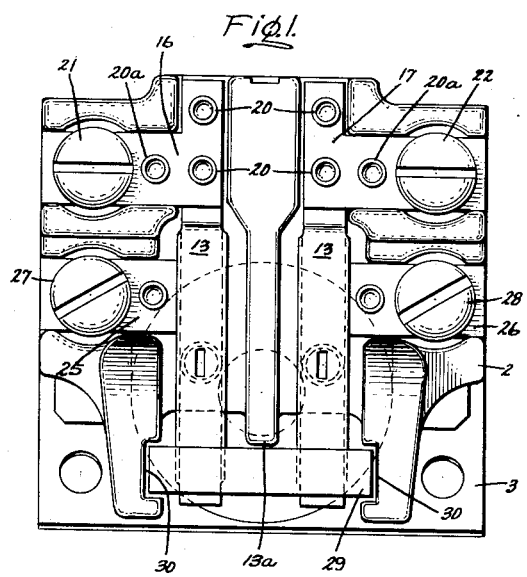
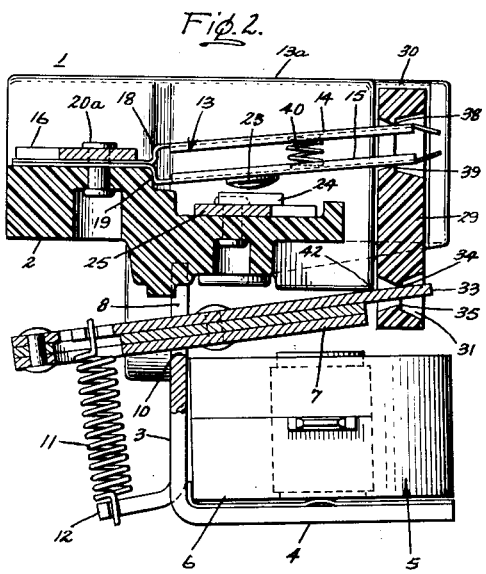
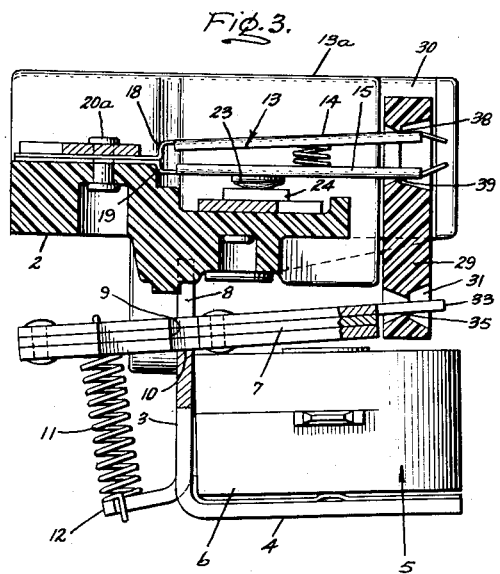
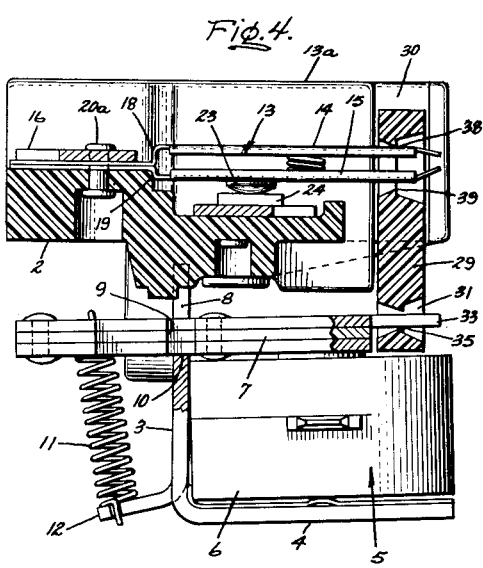
Inventors:
Don E. Moran,
Robert J. Culbertson,
by H. F. Manbeck, Jr.
Attorney

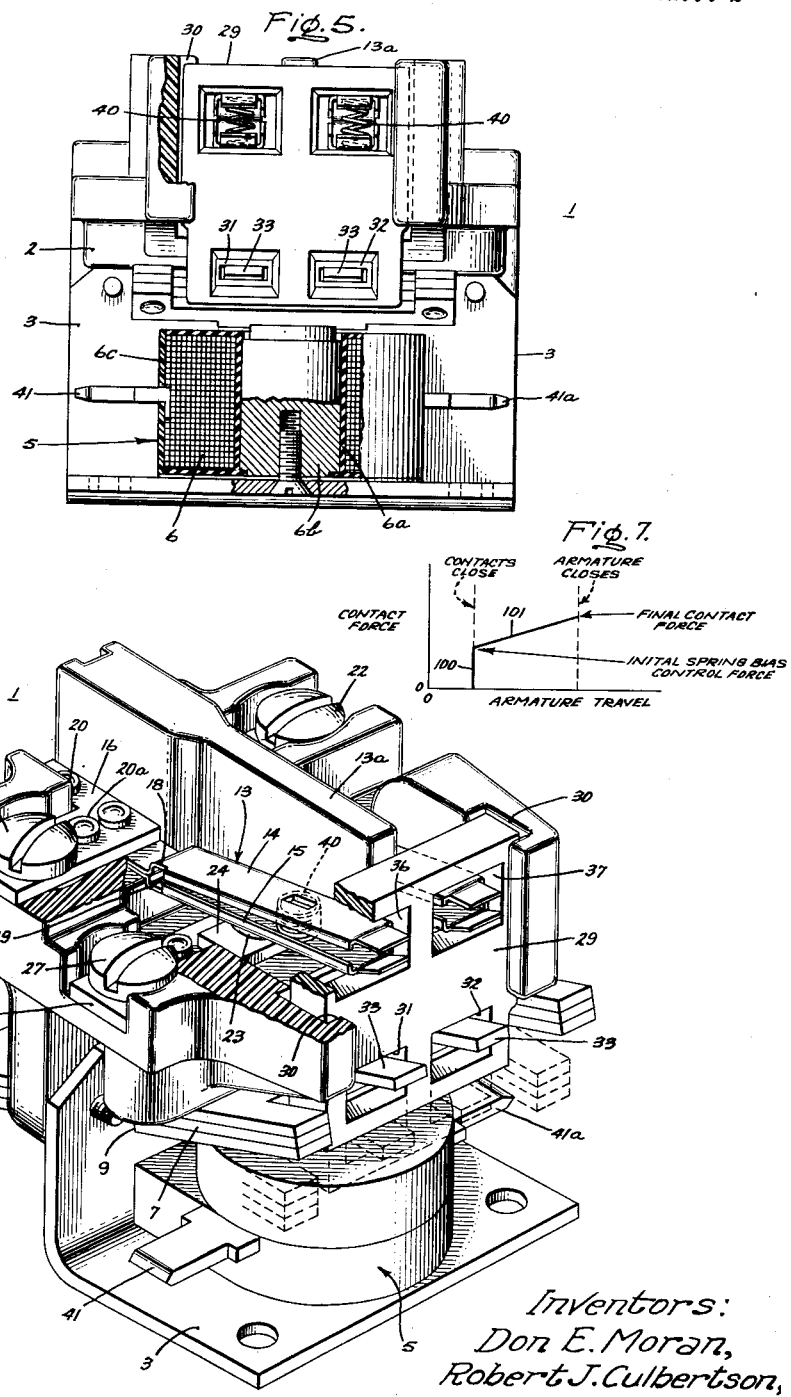

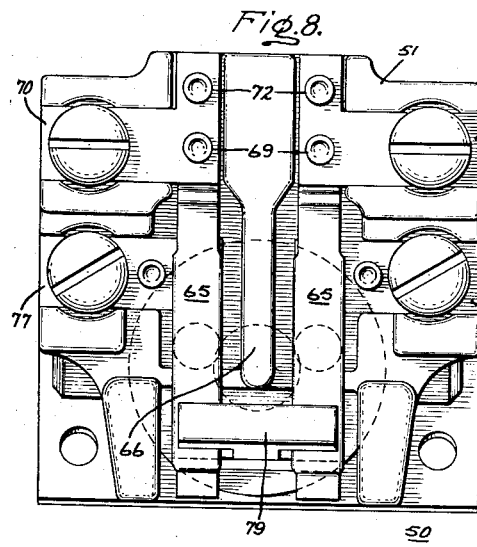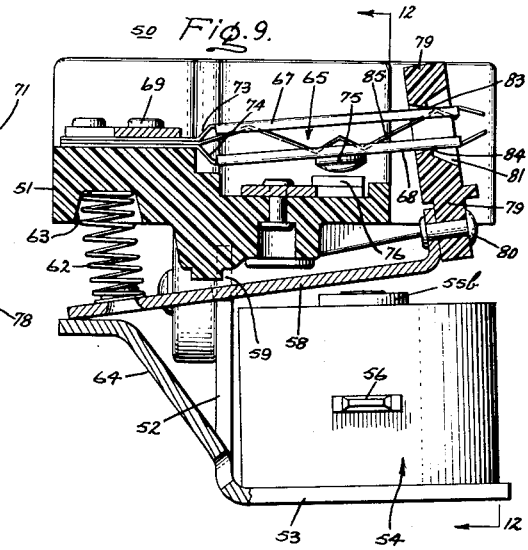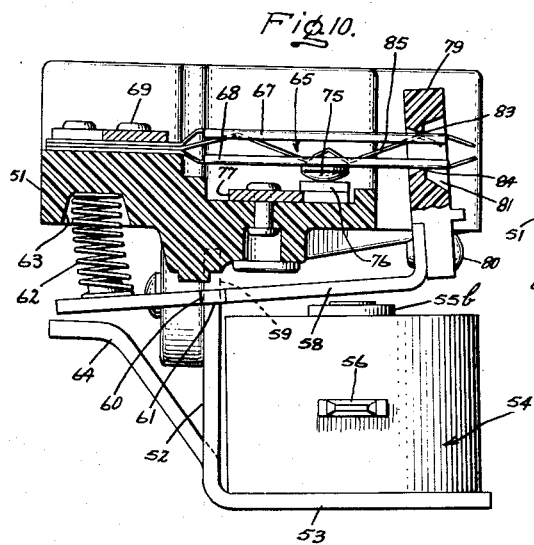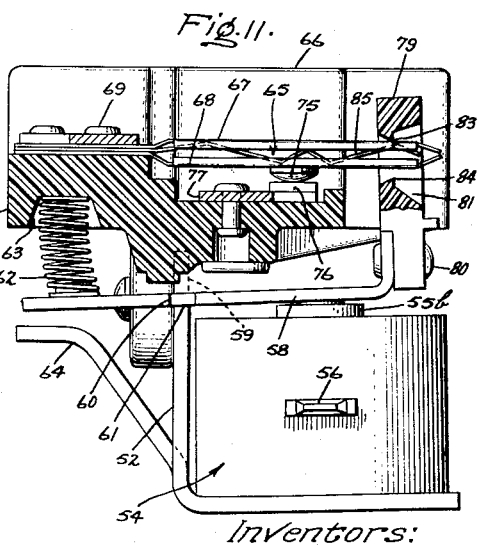

Dec. 19, 1961 D. E. MORAN ET AL 3,014,103
ELECTRICAL SWITCHING APPARATUS
Filed March 31, 1959 4 Sheets-Sheet 4

Inventor
Don E. Moran,
Robert J. Culbertson,
by H. F. Manbeck, Jr.
Attorney.

United States Patent Office 3,014,103
Patented Dec. 19, 1961

3,014,103
ELECTRICAL SWITCHING APPARATUS
Don E. Moran and Robert J. Culbertson, Morrison, Ill., assignors to General Electric Company, a corporation of New York
Filed Mar. 31, 1959, Ser. No. 803,293
11 Claims. (Cl. 200—87)

Our invention relates to electric switching devices, and more particularly to electromagnetic switches or relays in which the contact operation is controlled by means of an electromagnet.

In conventional electromagnetic switches and relays there is a tendency for the contacts to bounce apart after their initial closure. The contacts are ordinarily engaged at relatively high velocity and under appreciable pressure, whereby they may bounce apart as much as several times before closing. This contact bounce is very undesirable since it tends to cause arcing and even welding between the contacts. The tendency towards welding is particularly aggravated for relays which are used in circuits carrying substantial currents.

By reducing the contact bounce, the possibility of welding may be substantially reduced. Thus, a relay including means for eliminating the contact bounce, may be rated for a higher load current than a similar relay without such means. The higher current rating is, of course, desirable since it greatly widens the field of application of the relay. For example, in the motor control field, a relay without substantial contact bounce could be used with motors over a much wider range of horsepower ratings than could a conventional relay with the customary contact arrangements.

Accordingly, it is a primary object of our invention to provide a new and improved electromagnetic relay in which the contact bounce is extremely small upon the closure of the contacts.

Another object of our invention is to provide a new and improved switching device which requires only relatively inexpensive and easily fabricated parts, but in which contact bounce is substantially eliminated.

A further object of our invention is to provide an improved electromagnetic switching device which is capable of safely controlling relatively high currents for its size.

In carrying out our invention in one form thereof, we provide an electromagnetic relay including an insulating base member. A pair of leaf spring strips are mounted cantilever fashion on the base and extend generally parallel to each other. A contact is mounted on one of these strips for movement therewith, and a stationary contact is positioned for engagement by the movable contact. In order to actuate the movable contact, the relay includes an electromagnet and a movable armature controlled by the electromagnet. The armature is effective to flex the spring strip not mounting the contact, and a spring is positioned between the two strips for actuating the carrying contact strip from the other strip. As the contact carrying strip is actuated from the other strip, the contacts are closed before the travel of the other strip is completed. The spring between the strips provides a strong force immediately upon the contact closure to prevent bounce, and as the travel of the other strip continues, the spring is further stressed thereby supplying additional force to the contact carrying strip resisting bounce of the movable contact. This action is effective to limit the bounce very severely and thereby increase the current carrying capacity of the relay.

By further aspects of our invention, additional desirable features may be included in the relay, or other switching device including the contact arrangement, and the specification concludes with claims particularly pointing out and distinctly claiming the subject matter which we regard as our invention. The invention, however, as to organization and method of operation, together with further objects and advantages thereof, may best be understood by reference to the following description taken in conjunction with the accompanying drawings in which:

FIG. 1 is a top view of an electromagnetic relay embodying our invention in one form thereof;

FIG. 2 is a side view, partially broken away and partially in section, of the relay of FIG. 1, showing the relay in its contacts open position;

FIG. 3 is a view similar to FIG. 2 but showing the relay in an intermediate operating condition between the contacts open position and the contacts closed position;

FIG. 4 is a view similar to FIG. 2 but showing the relay in its contacts closed position;

FIG. 5 is a front view, partially broken away and partially in section of the relay of FIG. 1;

FIG. 6 is a perspective view of the relay of FIG. 1, partially broken away to show detail;

FIG. 7 is a graph of contact force preventing bounce versus the armature travel for the relay of FIG. 1;

FIG. 8 is a top view of an electromagnetic relay embodying our invention in an alternate form thereof;

FIG. 9 is a side view, partially broken away and partially in section, of the relay of FIG. 8, showing the relay in its contacts open position;

FIG. 10 is a view similar to FIG. 9, but showing the relay in an intermediate operating condition;

FIG. 11 is a view similar to FIG. 9, but showing the relay in its contacts closed position;

Figure 12:
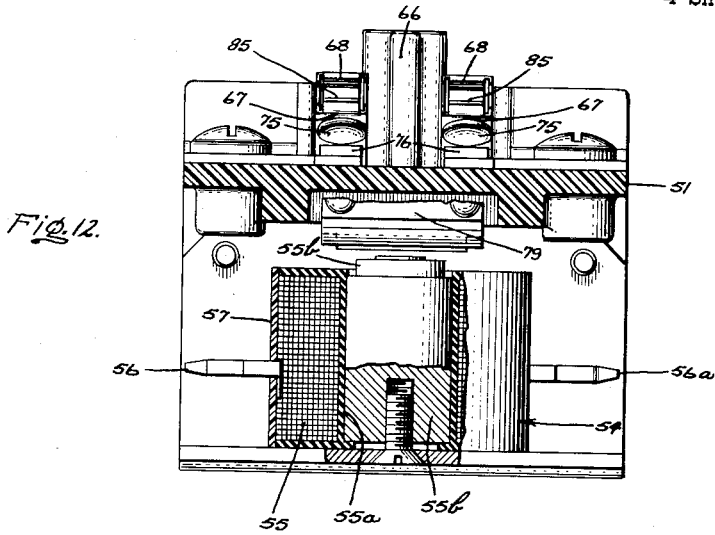
FIG. 12 is a sectional view, partially broken away, taken on the line 12—12 of FIG. 9.
Figure 13:
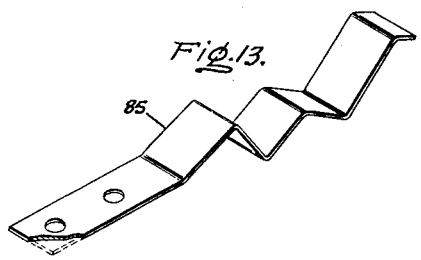
FIG. 13 is a perspective view of the waved spring included in the relay of FIG. 8 to eliminate contact bounce.

Referring now to FIGS. 1–6, we have shown therein an electromagnetic relay 1 which embodies our invention in one form thereof. The relay 1 includes a base member 2 formed of insulating material, and secured to the underside of the base 2 is a generally L-shaped frame or yoke 3 formed of magnetic material. Mounted on the foot portion 4 of the yoke 3 is an electromagnet 5 comprising a coil 6 wound on an insulating spool 6a which is in turn positioned around an axial iron core 6b. (See FIG. 5.) As shown, an insulating cover 6c may also be included in the electromagnet assembly.

Positioned on the yoke 3 for actuation by the electromagnet 5 is a laminated armature member 7. The armature 7 is positioned above the electromagnet 5 and at its left-hand end (as shown in the drawings) extends through a recess 8 in the upper end of the yoke 3. The armature includes grooves 9 in each side thereof which fit over the sides of the recess 8 and thereby prevent lateral shifting of the armature. The grooves, however, are somewhat wider than the thickness of the yoke whereby the fitting of the grooves 9 over the yoke does not prevent movement between the armature and the yoke. As can be seen form a comparison of FIGS. 2, 3 and 4, the armature 7 is pivotable with regard to the yoke 3 with the bottom surface 10 of the yoke recess 8 serving as the pivot point. Normally, the armature 7 is spring biased away from the electromagnet 5 by means of a tension spring 11 connected between its left-hand end (as viewed in the drawings) and a tab 12 formed on the yoke 3. The spring 11 by pulling downwardly on the left-hand end of the armature biases the right-hand portion of the armature upwardly away from the electromagnet 5.

Controlled by the armature 7 are a pair of identical contact assemblies 13 which are mounted on the upper side of the base 2 on opposite sides of a divider 13a formed integrally with the base. These contact assemblies 13 are especially constructed and arranged to limit bounce of the relay contacts, and as will now be explained, they constitute an important aspect of our invention. Each of the contact assemblies 13 includes a pair of leaf spring strips 14 and 15 which are mounted cantilever fashion on the base by means of terminals 16 and 17. As shown, the outer portions of the leaf spring strips 14 and 15 are spaced apart and extend generally parallel to each other. The inner or fixed ends of the strips are, however, in immediate contact with each other, the strips being provided with laterally extending portions or bends as indicated at 18 and 19 to provide for this. The inner ends of the strips 14 and 15 of the respective contact assemblies are secured to the terminals 16 and 17 by means of rivets 20, and, in particular, the strips of the left hand assembly (as viewed in FIG. 1) are secured to the terminal 16 and the strips of the right-hand assembly are secured to the terminal 17. The terminals 16 and 17 are, in turn, secured to the base 2 by the rivets 20a, and suitable hold-down screws 21 and 22 are provided on the terminals for attaching external leads.

Mounted on the lower side of each of the leaf spring strips 15 is a contact 23 which is positioned to move into and out of engagement with a cooperating stationary contact 24 upon flexure of the spring 15. When the leaf spring strips 15 are in their normal position, as indicated in FIG. 2, the contacts 23 are disengaged from the contacts 24. However, when the strips 15 are pulled downwardly by the electromagnet in a manner which will be described hereinafter, the contacts 23 are then brought into engagement or closed with the contacts 24. The two contacts 23 of the relay are, of course, connected respectively to the terminals 16 and 17 through the strips 15. The stationary contacts 24, as shown, are mounted respectively on additional terminals 25 and 26, which are provided respectively with suitable screws 27 and 28 for the attachment of external leads. Thus, it will be seen that when the contacts 23 and 24 are closed, a circuit is completed from the terminal 16 to the terminal 25 and a second circuit is completed from the terminal 17 to the terminal 26. When the relay is in its normal position, both of the circuits are opened by the disengagement of the contacts 23 and 24.

The leaf spring strips 15 mounting the movable contacts 23 are actuated from the armature 7 by means of a sliding actuator member 29 and the respective upper spring strips 14. As is best shown in FIG. 6, the actuator 29 comprises a plate-like member formed of insulating material, which is slidably mounted in grooves 30 in the base member 2. At its lower end, the actuator 29 is provided with windows 31 and 32 which accommodate tongues 33 formed on the armature 7. The windows 31 and 32 each include upper and lower knife edges 34 and 35 (see FIG. 2) and the tongues 33 on the armature engage the knife edges respectively to move the actuator 29 upwardly or downwardly.

At its upper end, the actuator 29 is provided with additional windows 36 and 37, and these windows accommodate the outer ends of the spring strips 14 and 15 of the respective contact assemblies. Each of the windows 36 and 37 is provided with an upper knife edge 38 and a lower knife edge 39 which engage respectively the associated strips 14 and 15 to actuate the contacts 23 (as will be explained hereinafter).

In order to transmit force between the upper and lower spring strips 14 and 15, and in accordance with our invention to limit contact bounce, there is positioned between the strips 14 and 15 of each of the contact assemblies, a compression spring 40, here shown as a coil spring. The spring 40, it will be noted, is positioned in each assembly outwardly from the fixed ends of the strips beyond the contact 23, but also is well inwardly from the free ends of the strips. Suitable tabs are bent out of the strips 14 and 15 to hold the spring 40 in place, and it will also be noted that side flanges are formed on the strips 14 and 15 so that they are relatively stiff throughout, and do not tend to flex except adjacent the bent or laterally extending portions 18 and 19.

With the strips 14 and 15 being stiff except at the bends 18 and 19, the springs 40 act to bias them apart, with the strips flexing around the portions 17 and 18 as pivots. In other words, in each of the contact assemblies, the spring 40 biases the upper strip 14 into contact with the knife edge 38 and the lower strip 15 into contact with the lower knife edge 39 when the relay is in its normally open positions as shown in FIGS. 2, 5, and 6.

To explain the method of operation of the relay and the manner in which contact bounce is substantially eliminated in it, and assuming the relay is initially in its normally open position, when current is applied to the electromagnet 5 through the terminals 41 and 41a provided on it, a magnetic field is then set up tending to pull the armature downwardly. As shown in FIG. 3, the armature begins to pivot downwardly on the surface 10 as a pivot and the tongues 33 move downwardly engaging the knife edges 35 of the lower windows in the actuator. The actuator 29 is then pulled downwardly in its grooves and force is applied by it to the upper leaf spring strips 14. In other words, the engagement of the knife edges 38 with their respective strips 14 tends to pull those strips downwardly. As the upper strips 14 are moved downwardly, their movement is transmitted through the compression springs 40 to the lower spring strips 15. In other words, by reason of the force transmitted through the springs 40, the lower strips 15 are moved downwardly together with and at generally the same rate as the upper strips 14.

This movement continues until such time as the movable contacts 23 engage the stationary contacts 24. At that time the downward movement of the contacts 23 and the lower strips 15 terminates; but as indicated in FIG. 3, the armature 7 and the actuator 29 at that time have not finished their travel. Rather after the initial contact engagement is made between the contacts 23 and 24, the armature 7 and the actuator 29 continue to move downwardly to their final position shown in FIG. 4.

As each of the contacts 23 engages its stationary contact 24, the associated spring 40 immediately provides a strong force preventing bounce of the contact. In other words, the biasing force applied to each of the strips 15 by the associated spring 40 acts immediately as a closure force preventing bounce. This action may be seen clearly by reference to the diagram of FIG. 7, wherein the amount of the immediate or initial spring bias control force on the contacts 23 is indicated by the generally vertical line 100. As the armature 7 and the actuator 29 continue to move after this first contact closure, the actuator 29 carries the upper strips 14 with it thus compressing the springs 40 still further between their respective strips 14 and 15. In other words, after the contacts are closed, the movement of the strips 14 continues so that an increasing resilient force or pressure is built up on strips 15 by the springs 40. The manner of the increase in pressure is indicated by the line 101 in FIG. 7. This increasing pressure together with the initial spring pressure on the contact closure, tends to prevent the contacts 23 from bouncing off the contacts 24. It will be understood that the force increases steadily until the armature has reached the limit of its travel, thereby continuously increasing the original contact pressure between the movable contacts 23 and the stationary contacts 24. The contact bounce is held to a very small value by this action and in fact is substantially eliminated.

Besides the action of the spring 40 between the strips 14 and 15, there are several other features of our improved relay tending to limit contact bounce. One of these features is the position of the contacts 23 on the strips 15. The contacts 23, as shown, are relatively close to the pivots or bends 18 around which the strips flex.

The contacts 23 being much closer to the flexure points than the actuator 29, move much slower than the actuator and thereby the velocity of the contacts as they engage the stationary contacts 24 is relatively low. This reduced velocity, of course, helps to prevent contact bounce since it does not create as much momentum in the moving contacts. Further, due to this positioning close to the flexure points of the strips, the contact pressure at the initial closing is relatively high, which also helps to limit bounce. Still another feature tending to prevent contact bounce is that the armature 7 is of a rather heavy mass for a small relay. The heavy mass of the armature contributes to keeping the velocity of the system low and thereby to the desired result. Thus, from all of the above, it will be seen that we have provided a particularly advantageous electromagnetic relay in which contact bounce is practically eliminated.

In addition to providing a contact closing action with little or no contact bounce, the relay 1 also provides for reliable action over a relatively long life. The mounting of the actuator 29 in the guides 30 is particularly desirable in this regard. The sliding action of the actuator in the guides, together with the knife edges 38 and 39, provides an action whereby there is very little friction between the actuator and the leaf spring strips 14 and 15. Since friction between the actuator and the strips could become objectionable particularly over the expected life of the relay, this relatively friction free action is of considerable worth.

The opening action of the relay is in general the reverse of the closing action. As power is removed from the electromagnet 5, the armature 7 is, of course, free to pivot upwardly under the action of the biasing spring 11. As the right-hand end of the armature pivots upwardly, the tongues 33 leave the lower knife edges 35 and engage the upper knife edges 34 thereby moving the actuator or slide 29 upwardly. As the motion of the actuator continues, the stress or compression of the springs 40 is relieved as the movement of the knife edges 38 permits the spring strips 14 to move upwardly. When the actuator reaches the position shown in FIG. 3, the lower knife edge 39 then moves into engagement with the lower spring strips 15. The strips 15 are then carried upwardly and the contacts 23 are disengaged from the stationary contacts 24. This breaking of the contacts 23 and 24 occurs at a relatively low velocity for the same reason as was explained for the contact making operation. The low velocity during breaking is particularly desirable for alternating current circuits, and especially where the relay is connected in an alternating current circuit, there is relatively little arcing as the contacts separate. The minimizing of the arcing during disengaging also aids to prolonging the life of the relay. Once the strips 15 start to move, the strips 14 are then actuated through the springs 40 and the combined upward movement of the actuator 29 and the strips 14 and 15 continues until the armature 7 engages the under side of the base 2 as shown at 42. This engagement terminates the opening operation leaving the relay in its normally open position shown in FIG. 2.

The incidence of arcing and contact welding is extremely low in the relay 1 for the reasons explained above. It will be noted though that heavy contact opening forces are provided therein. Thus even if an occastional weld should occur, heavy forces are available to break it. In particular, the force of the large tension spring 11 creates momentum in the armature 7 and the actuator 29 when the electromagnet 5 is de-energized. The spring force and the momentum are suddenly applied to the strips 15 when the armature and actuator have moved to the point illustrated in FIG. 3 where the knife edges 35 engage the strips 15. Since the strips 15 do not flex between the actuator and the contacts, this action creates a heavy impact thrust on the contacts 23 to separate them from the contacts 24. The contact opening operation in the relay 1 is thus equally as desirable as the non-bouncing contact closing operation.

Referring now to FIGS. 8 through 14, we have shown therein a relay 50 embodying our invention in an alternate form thereof. The relay 50 includes a base 51, formed of insulating material, on the underside of which is mounted a frame or yoke 52 formed of magnetic material. Mounted on the foot portion 53 of the yoke 52 is an electromagnet 54 comprising a coil 55 wound on an insulating bobbin 55a which is in turn positioned around an axial iron core 55b (see FIG. 12). The coil of the electromagnet is provided with suitable terminals 56 and 56a for supplying current thereto, and as shown, the coil may also be provided with an insulating cover 57.

Disposed over the electromagnet for actuation thereby is an armature 58 formed of magnetic material. The armature 58 at its right-hand end (as viewed in the drawings) extends over the magnet core 55b and at its left-hand end it extends through a recess 59 cut in the upper end of the yoke.

In order to prevent lateral movement of the armature 58, grooves 60 are provided on its edges which fit over the sides of the recess 59. The width of the grooves 60 is, however, somewhat greater than the thickness of the yoke whereby there is some clearance between the grooves and the yoke. This permits pivoting movement of the yoke upwardly and downwardly in response to the magnetic field created by the electromagnet 54. The bottom of the recess 59 serves as a pivot point 61 for this movement, as can best be seen from the comparison of FIGS. 9–11.

The armature 58 is normally biased away from the electromagnet 54 by means of a compression spring 62 which engages its left-hand end. The spring 62 as shown, is positioned between the left-hand end of the armature and the underside of the base 51. Specifically, the spring 62 protrudes into a recess 63 provided in the base and it biases the left-hand end of the armature 58 downwardly at all times. A tongue or tab 64 formed on the yoke 52 serves as a stop to limit the downward movement of the left-hand end of the armature and thereby determines the normal position of the armature. When the left-hand end of the armature engages the tongue 64 under the bias of the spring 62, the right-hand portion of the armature is spaced somewhat above the iron core 55b of the electromagnet.

The armature 58 controls two identical contact assemblies 65 which are mounted on the upper side of the base 51 on opposite sides of a divider 66 formed integrally with the base. The construction and arrangement of these contact assemblies 65 and their manner of operation in the relay to limit contact bounce comprises another important aspect of our invention. As will be explained in detail hereinafter, these assemblies operate under the actuation of the armature to close the contacts of the relay with little or no bounce after the initial closure.

Each of the contact assemblies 65 includes a pair of leaf spring strips 67 and 68. These strips are mounted cantilever fashion on the base with their left-hand ends (as viewed in the drawings) fixed to the base and their right-hand ends free to move. As shown, the free portions of the strips 67 and 68 extend generally parallel to each other in a spaced apart relationship. However, the fixed ends of the strips lie immediately adjacent each other and are secured to the base by means of rivets 69. Specifically, the fixed ends of the strips 67 and 68 are attached to the base 51 and also to either terminal 70 or terminal 71 (depending upon the contact assembly involved) by the rivets 69. Additionally, rivets 72 provide further securement of the strips to the terminals. Bends or laterally extending portions 73 and 74 are provided respectively in the strips 67 and 68 to offset the outer portions from the fixed inner portions. The outer or free portions of the strips 67 and 68 include flanges along their edges whereby they are relatively stiff and do not tend to flex. Rather, any flexing or pivoting of the strips takes place around the laterally extending portions or bends 73 and 74.

The lower strip 68 of each assembly has mounted thereon a contact 75. These contacts 75 comprise the movable contacts of the relay and they are arranged to cooperate with stationary contacts 76 mounted on the base 51. The stationary contacts 76, as shown, are attached to suitable terminal strips 77 and 78, and as mentioned above, the strips 67 and 68 of the assemblies 65 are attached respectively to terminals 60 and 71. Thus, the opening and closing of the two sets of contacts 75 and 76 respectively opens and closes circuits between terminals 70 and 77 and terminals 71 and 78.

In order to actuate the strips 67 and 68 from the armature 58, there is provided an actuator 79 formed of insulating material. At its lower end this actuating member is attached to the armature 58 by means of rivets 80, and at its upper end the actuator is provided with windows 81 and 82 (FIG. 14) which accommodate the outer ends of the contact strips 67 and 68 of the respective assemblies 65. Each of the windows 81 and 82 is provided with a knife edge 83 for engaging the upper strip 67 and a knife edge 84 for engaging the lower strip 68. By reason of these knife edges, the upper strip 67 is moved downwardly upon downward movement of the actuator and the lower contact strip 68 is moved upwardly upon the upper movement of the actuator.

In order to transmit the motion of strips 67 to strips 68 and vice versa, and in accordance with our invention for eliminating contact bounce, there is positioned between the strips 67 and 68 in each of the contact assemblies a waved spring member 85. The left ends of the springs 85 are secured to the base and the terminals 71 by means of the rivets 69 and 72, and their right-hand or free ends are formed generally in the shape of a W. As shown, the spring 85 of each assembly has two points of contact with the associated lower strip 68 and two points of contact with the associated upper strip 67. The points of contact with the lower strips are, as shown, between those with the upper strips. It will be particularly noted that the springs 85 are not secured in any way to the strips 67 and 68 at these points of contact with the cantilever portions thereof. Rather, there is only frictional engagement between the springs and the strips at these points of contact.

Figure 14:
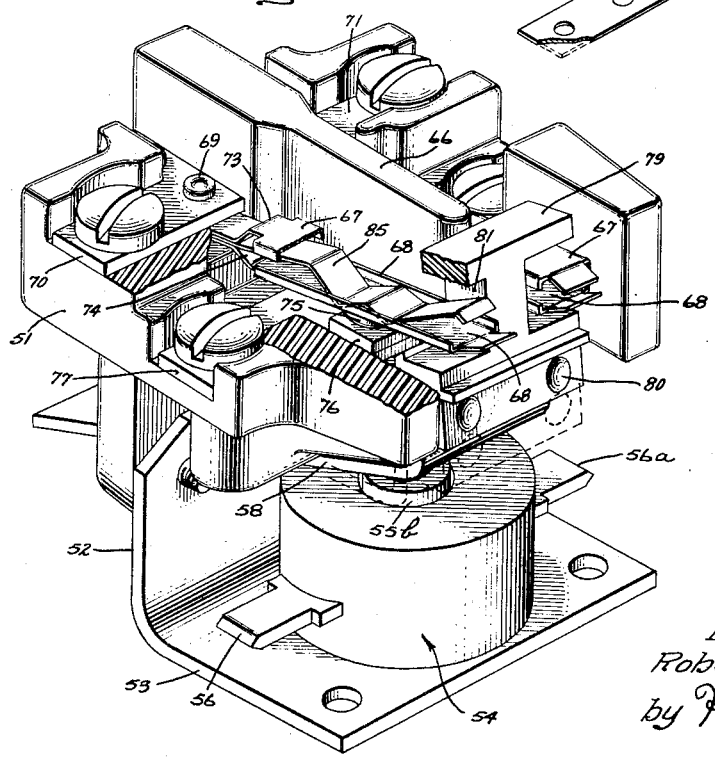
FIG. 14 is a perspective view of the relay of FIG. 8, partially broken away to show detail.

With the strips 67 and 68 being stiff except at the bends 73 and 74, the waved springs 85 act to bias them apart, with the strips flexing around the portions 73 and 74 as pivots. In other words, when the relay 50 is in its normally open position as shown in FIGS. 9, 12 and 14, each of the waved springs 85 biases its upper strip 67 into contact with the associated knife edge 83 of actuator 79, and its lower strip 68 into contact with the associated knife edge 84.

The action of the spring 85, as will now be explained, aids greatly in eliminating contact bounce in the relay 50. Assuming the relay to be in its normal or open position shown in FIG. 9, and further assuming that current is then applied to the electromagnet 54, a magnetic field is set up tending to pull the right-hand end of the armature 58 downwardly. As the armature 58 pivots downwardly, it carries with it the armature 79 which is freely mounted without contact with the base 2. As the actuator 79 moves downwardly, the knife edges 83 engage the upper strips 67 of the contact assemblies and carry the strips 67 with the actuator. The motion of the strips 67 is transmitted by the springs 85 to the lower strips 68, and they too move downwardly until the movable contacts 75 engage the stationary contacts 76. In other words, the spring strips 67 and 68 move together until the movable contacts engage the stationary contacts as shown in FIG. 10. The strips 67 and 68, as shown, move by flexing about the bends 73 and 74, without there being any substantial bending of the outer cantilever portions of the strips.

As each of the contacts 75 engages its stationary contact 76, the associated spring 85 immediately provides a strong force preventing bounce of the contact. In other words, the biasing force applied to each of the strips 68 by the associated spring 85 acts immediately as a closure force preventing bounce. This initial spring bias control force, of course, corresponds to that indicated by the vertical line 100 in FIG. 7 for the relay 1.

At the time the initial engagement is made between the contacts 75 and 76, the armature 58 and the actuator 79 have not, however, reached the limit of their travel. Rather, they still continue to move downwardly under the pull of the electromagnet. Thus, the strips 67 also continue to move downwardly and the springs 85 are further stressed or compressed between the strips 67 and 68 of the respective contact assemblies. As may be seen by a comparison of FIGS. 10 and 11, the springs 85 flatten out there being a slight frictional movement of their points of contact with the associated strips 67 and 68. Thus, as the strips 67 continue to move downwardly after the initial engagement of the contacts, an increasing damping pressure is built up behind the lower strips 68, corresponding to that indicated by the line 101 in FIG. 7. This pressure or force tends to prevent bouncing of the contacts 75 off the contacts 76 and in fact reduces the contact bounce to a very small value. Not only the stress build-up in the springs 85 themselves, but also the frictional resistance to the movement of the points of contact aid in providing the damping action to contact bounce. It will be noted that, as in the first embodiment, the contacts are located relatively near the lateral portions 73 and 74 of the strips so that the contact velocity upon the initial closing is relatively slow.

Once the contacts 75 and 76 are closed, they then remain closed as shown in FIG. 11 for so long as current is supplied the electromagnet. When the current on the electromagnet is discontinued, the armature 58 then pivots upwardly under the biasing action of the spring 62. The initial movement of the armature 58 and the actuator 79 allows a similar movement of the strips 67 so that the springs 85 return to their original shape and position relieving the damping pressure on the contacts 75. Then as the lower knife edges 84 engage the strips 68, the strips 68 are moved upwardly and the contacts 75 separated from the stationary contacts 76. Due to the mass of the armature and the positioning of the contacts 75 close to the flexure points of the strips, this action is at a relatively slow velocity resulting in relatively little arcing. Thus, in this second embodiment as in the first described embodiment, a good contact opening action is obtained as well as a good contact closing operation. The opening movement is terminated when the left-hand end of the armature 5 engages the stop 64 defining the normally open position of the relay. Like relay 1, the relay 51 is so constructed and arranged that heavy contact opening forces are provided therein. The pressure of the large compression spring 62 creates considerable momentum in the armature 58 and the actuator 79 when the electromagnet 54 is de-energized. The spring force and the momentum are suddenly applied to the strips 68 when the armature and actuator have moved upwardly somewhat from the ultimate closed portion shown in FIG. 11 to the point (shown in FIG. 10) where the knife edges 84 engage the strips. Since the strips 68 do not flex between the actuator and the contacts, this action creates a heavy impact thrust on the contacts 75 to separate them from the contacts 76. Thus, even if an occasional welding of the contacts should occur, heavy forces are available to break it.

While in accordance with the patent statutes we have described what at present are considered to be the preferred embodiments of our invention, it will be obvious to those skilled in the art that various changes and modifications may be made therein without departing from the invention, and we, therefore, aim in the following claims to cover all such equivalent variations as fall within the true spirit and scope of the invention.

What we claim as new and desire to secure by Letters Patent of the United States is as follows:

1. An electromagnetic relay comprising a base member, a pair of leaf spring strips extending generally parallel to each other and mounted cantilever fashion on said base, a first contact, a second contact mounted on one of said strips for engaging said first contact, means including an electromagnet and a movable armature controlled by said electromagnet for flexing the other of said strips toward said first contact, and a spring positioned between said strips for biasing said strips apart and for actuating the contact carrying strip from said other strip to close said contacts, said second contact engaging said first contact before the travel of said other strip is completed, whereby said spring is stressed further after the initial contact engagement to aid in preventing bounce of the movable contact.

2. In an electric switching device, a base member, a pair of leaf spring strips extending generally parallel to each other and mounted cantilever fashion on said base, a first contact, a second contact mounted on one of said strips for engaging said first contact, actuating means for flexing the other of said strips toward said first contact, and a spring positioned between said strips for actuating the contact carrying strip from said other strip to close said contacts, and for damping contact bounce upon the contact closure.

3. In an electric switching device, a base, a pair of leaf spring strips each mounted on its one end on said base and each having an outer cantilever portion offset laterally from its fixed end, said cantilever portions being arranged to flex relative to said fixed ends, a first contact, a second contact mounted on one of said strips for engaging said first contact, actuating means for flexing the other of said strips toward said first contact, and a spring positioned between said strips for biasing said strips apart and for actuating the contact carrying strip from said other strip to close said contacts, said second contact engaging said first contact before the travel of said other strip is completed, whereby said spring is stressed further after the initial contact engagement to aid in preventing bounce of the movable contact.

4. An electromagnetic relay comprising a base member, a pair of leaf spring strips each mounted on said base member at its one end and each having an outer cantilever portion offset from its fixed end, said cantilever portions being ararnged to flex relative to said fixed ends, a stationary contact, a second contact mounted on the cantilever portion of one of said strips for engaging said stationary contact, means including an electro-magnet and a movable armature controlled by said electromagnet for flexing said cantilever portion of the other of said strips toward said stationary contact, and a spring positioned between the cantilever portions of said strips for biasing said strips apart and for actuating the contact carrying strip from said other strip to close said contacts, said second contact engaging said stationary contact before the travel of said other strip is completed whereby said spring is further stressed after the initial contact engagement to aid in preventing bounce of the movable contact.

5. In an electric switching device, a base member, a pair of leaf spring strips each mounted on said base member at its one end and each having an outer cantilever portion offset laterally from its fixed end, said cantilever portions being adapted to flex relative to said fixed ends, a stationary contact, a second contact mounted on one of said strips for engaging said stationary contact, actuating means for flexing the other of said strips toward said stationary contacts, a compression spring positioned between said strips for actuating said contact carrying strip from said other strip to close said contacts and for damping contact bounce upon the contact closure, said spring being located between said second contact and the outer free ends of said strips and said strips being relatively rigid between said free ends and said second contact.

6. An electromagnetic relay comprising a base member, a pair of leaf spring strips extending generally parallel to each other and mounted cantilever fashion on said base, a first contact, a movable contact mounted on one of said strips for engaging said first contact, an electromagnet, a movable armature controlled by said electromagnet, an actuator engaging the other of said strips not carrying said movable contact and operated by said armature for flexing said other strip toward said first contact, guide means formed in said base and accommodating said actuator for sliding movement therein, a spring positioned between said strips for biasing said strips apart and for actuating the contact carrying strip from said other strip to close said contacts, said second contact engaging said stationary contact before the travel of said other strip is completed whereby said other strip is further stressed after the initial contact engagement to aid in preventing bounce of the movable contact, and spring means secured to one of said actuator and said armature for normally biasing said actuator and said strips to a contacts open position.

7. An electromagnetic relay comprising an electromagnet, a movable armature controlled by said electromagnet, a magnetic frame mounting said electromagnet, a pair of leaf spring strips extending generally parallel to each other and mounted cantilever fashion on said base, a stationary contact, a second contact mounted on one of said strips for engaging said secondary contact, a movable actuator engaging the other of said strips for flexing said other strip toward said stationary contact, an electromagnet, a movable armature controlled by said electromagnet, said armature being mounted for pivotal movement and having tongues engaging said actuator to move said actuator and thereby flex said other strip, a spring positioned between said strips for actuating the contact carrying strip from said other strip to close said contacts and for damping contact bounce upon the contact closure, and separate spring means mounted between said frame and said armature for normally biasing said contacts to an open position.

8. In an electric switching device, a base member, a pair of leaf spring strips extending generally parallel to each other and mounted cantilever fashion on said base member, a first contact, a movable contact mounted on one of said strips for engaging said first contact, actuating means for flexing the other of said strips toward said stationary contact, and a waved leaf spring positioned between said strips for actuating the contact carrying strip from said other strip to close said contacts and for damping contact bounce upon the contact closure, said waved spring being fixedly secured at one end and engaging said contact carrying spring adjacent said contact and said other strip on either side of said contact.

9. The switching device of claim 8 wherein said waved spring is generally W-shaped having two points of engagement with said contact carrying strip between its points of engagement with said other strip.

10. In an electromagnetic relay comprising a base member, a pair of leaf spring strips extending generally parallel to each other and mounted cantilever fashion on said base, a stationary contact, a second contact mounted on one of said strips for engaging said stationary contact, an electromagnet, a movable armature controlled by said electromagnet, an actuator operated by said armature and engaging the other of said strips not carrying said contact for flexing said other strip toward said stationary contact, and a waved leaf spring positioned between said strips for biasing said strips apart and for actuating the contact carrying strip from said other strip to close said contacts, said waved spring being fixedly secured at one end and engaging the contact carrying strip adjacent said contact and the other strip on either side of said contact, said spring being further stressed by the travel of said other strip after said contacts are engaged whereby a sliding movement of the points of engagement between said waved spring and said strips is effected to aid in damping bounce of the movable contact.

11. The relay of claim 10 wherein said waved spring is generally W-shaped having two points of engagement with said contact carrying strip between its points of engagement with said other strip.

References Cited in the file of this patent

UNITED STATES PATENTS

| | | |
|---|---|---|
| 1,702,075 | Chireix et al. | Feb. 12, 1929 |
| 2,377,137 | Eaton | May 29, 1945 |
| 2,417,758 | Immel | Mar. 18, 1947 |
| 2,426,068 | Taliaferro | Aug. 19, 1947 |
| 2,496,376 | Cleaveland et al. | Feb. 7, 1950 |
| 2,839,631 | Rice | June 17, 1958 |
| 2,946,872 | Siebers | July 26, 1960 |

FOREIGN PATENTS

| | | |
|---|---|---|
| 62,239 | Norway | Mar. 26, 1940 |
| 731,713 | Great Britain | June 15, 1955 |